UNITED STATES PATENT OFFICE.

EINAR BERGVE, OF NOTODDEN, NORWAY, ASSIGNOR TO NORSK HYDRO-ELEKTRISK KVAELSTOFAKTIESELSKAB, OF CHRISTIANIA, NORWAY, A JOINT-STOCK COMPANY OF NORWAY.

METHOD FOR THE DECOMPOSITION OF ALKALI-METAL MINERALS.

1,346,365.     Specification of Letters Patent.     Patented July 13, 1920.

No Drawing.     Application filed April 30, 1919. Serial No. 293,876.

*To all whom it may concern:*

Be it known that I, EINAR BERGVE, subject of Norway, residing at Notodden, Norway, have invented new and useful Improvements in Methods for the Decomposition of Alkali-Metal Minerals; and I do hereby declare the following to be a full, clear, and exact description of the same.

Through the action of sulfur vapor upon alkali metal silicates a partial reduction of chemically combined oxygen will take place, sulfo-silicates being formed, for instance potassium feldspar.

$K_2O.Al_2O_3.6SiO_2$ is treated with sulfur vapor, the $K_2O$ already at a proportionally low temperature (below 1000° C.) will be converted into $K_2S$ as this reaction is exothermic. If the temperature is further increased the endothermic reaction *i. e.* the reduction of $Al_2O_3$ into $Al_2S_3$ will also commence. These two sulfids combine with $SiO_2$ forming oxy-sulfo-silicates. When a sufficiently high temperature is used the $SiO_2$ may also be converted into $SiS_2$ which together with the sulfobases forms sulfo-silicates, as above mentioned. Temperatures of about 800° to 1400° C. will be found satisfactory.

These sulfo-silicates or oxy-sulfo-silicates may be decomposed with water under pressure and at high temperature so that the alkalis are obtained in solution. It has however also been observed that sulfo-silicates and oxy-sulfo-silicates at common pressure and temperature can be decomposed by even the weakest acids.

The present process may be carried out quite as effectively if the sulfur vapors are mixed with $SO_2$, also the sulfurous roast gases may be used, which are obtained in several metallurgical processes for instance in the melting of pyrite in order to obtain copper-matte.

Having now described my invention, what I claim as new and desire to secure by Letters Patent is:

1. The method of decomposing alkali metal silicates, which consists in subjecting the silicate to the action of sulfur vapors at temperatures of about 800° to 1400° C.

2. A method according to claim 1, in which decomposition takes place in an atmosphere containing sulfur and sulfur dioxid.

In testimony whereof, I have signed my name to this specification in the presence of two subscribing witnesses.

EINAR BERGVE.

Witnesses:
AXEL LAHN,
HAROLD LAHN.